(12) United States Patent
Gundersen

(10) Patent No.: US 7,000,556 B2
(45) Date of Patent: Feb. 21, 2006

(54) SEALING DEVICE AND METHOD FOR SEALING BETWEEN A CHAIN AND A CHAIN PIPE

(75) Inventor: Morten Gundersen, Kärna (SE)

(73) Assignee: GVA Consultants AB, Goteborg (SE)

( * ) Notice: Subject to any disclaimer, the term of this patent is extended or adjusted under 35 U.S.C. 154(b) by 0 days.

(21) Appl. No.: 10/841,509

(22) Filed: May 10, 2004

(65) Prior Publication Data

US 2005/0022712 A1    Feb. 3, 2005

(30) Foreign Application Priority Data

May 14, 2003   (SE)   ................................. 0301429-7

(51) Int. Cl.
*B63B 21/08* (2006.01)

(52) U.S. Cl. ........................ 114/180; 114/200; 277/583

(58) Field of Classification Search ................ 114/180, 114/200; 277/583
See application file for complete search history.

(56) References Cited

U.S. PATENT DOCUMENTS

| | | | |
|---|---|---|---|
| 2,662,018 A | | 5/1953 | Griffith |
| 2,652,018 A | * | 9/1953 | Griffith ........................ 114/180 |
| 3,661,112 A | * | 5/1972 | Angell ........................ 114/200 |
| 4,567,840 A | | 2/1986 | Arlt et al. |
| 4,679,800 A | | 7/1987 | Burton |

FOREIGN PATENT DOCUMENTS

| | | |
|---|---|---|
| GB | 2 174 041 A | 10/1986 |
| GB | 2 263 256 A | 7/1993 |

\* cited by examiner

*Primary Examiner*—Stephen Avila
(74) *Attorney, Agent, or Firm*—Birch, Stewart, Kolasch & Birch, LLP

(57) ABSTRACT

A sealing device (1) and method for sealing between a chain (2) and a chain pipe (3), said chain for example being an anchor chain on a marine offshore platform or on a ship, and said chain pipe (3) leading for example to a chain locker for onboard storage of the chain in said platform or ship. The sealing device (1) comprises at least two opposing cover lids (7) positioned at the mouth (8) of the chain pipe (3) or an extension collar (7) thereof. The cover lids (7) are movably arranged from an open position into a closed position in which the cover lids (7) abut each other and seal the chain pipe (3) from water intrusion by sealingly engaging a chain link (10) of the chain. Furthermore, the cover lids (7) are provided—in mutual abutment sides (15) thereof—with one or more recesses (16) shaped in conformity with the contacting outer periphery (17) of said chain link (10). The invention is especially characterized in that the cover lids (7) each exhibit at least one inflatable seal element (18), said seal element (18) extending along a respective mutual abutment side (15) of the cover lids (7) and being adapted to expand upon pressurization with a fluid such as pressurized air, into a radial sealing engagement with the chain link (10), and that the cover lids (7) are attached to an extension collar (9) of the chain pipe (3), said extension collar (3) being movably arranged with respect to the rest of the chain pipe (3) by means of a flexible interconnection collar (47) mounted therebetween.

20 Claims, 12 Drawing Sheets

SEALING DEVICE AND METHOD FOR SEALING BETWEEN A CHAIN AND A CHAIN PIPE

This Non-provisional application claims priority under 35 U.S.C. § 119(a) on Patent Application No(s). 0301429-7 filed in Sweden on May 14, 2003, the entire contents of which are hereby incorporated by reference.

TECHNICAL FIELD

The present invention relates to a sealing device and method for sealing between a chain and a chain pipe, said chain for example being an anchor chain on a marine offshore platform or on a ship, and said chain pipe leading for example to a chain locker for onboard storage of the chain in said platform or ship.

BACKGROUND

A marine offshore platform of the semi-submersible type is often anchored at each corner column by several anchor chains. Some platform designs has four anchor chains at each corner column. The anchor chains—or the part of them currently not in use, usually referred to as the tail ends of the chains—are stored in separate chain lockers that are normally positioned low in the pontoons of the platform, with vertical chain pipes extending within the columns from the chain lockers to a deck fitted with anchor winches. Similar chain lockers and chain pipes are also used on conventional ships, but in a smaller scale and in lesser numbers.

Due to the large volumes of the chain lockers, and since the chain pipes are directly communicating with the chain lockers, it is normal practice to place the top mouth portions of the chain pipes above as many pre-calculated damage waterlines as possible for stability reasons. To insure the watertight integrity of the vessel as per governing maritime regulatory requirements, the system is dimensioned to cope with serious damage scenarios in which the top mouth portions are submerged. Hence, the top mouth portions of the chain pipes must either be sealed from water intrusion while the anchor chains are stationary, or both the chain lockers and the chain pipes will have to be constantly filled with water in order to avoid an unacceptable notch in the stability curve of the vessel. Since constant water fill will substantially reduce valuable payload of the vessel, various devices and methods for sealing the chain pipes are known.

A problem involved with sealing between the chain pipe and the anchor chain is that the chain links normally have a very coarse outer surface due to corrosion and biological marine fouling, which makes it difficult to obtain an effective sealing contact. The oldest, and perhaps the most drastic solution to this problem is to temporarily mould the top mouth portion of the chain pipe with concrete. The concrete sealing will then be manually hacked up when the anchor chain is to be moved again. This is of course an awkward method which is obviously unsuited for repeated operation of the anchor chains.

Another known solution to the problem is to place two opposing, horizontally slidable cover lids at the mouth of the chain pipe. The slidable cover lids engage the chain link in a "guillotine"-fashion into a closed position in which the cover lids abut each other and seal the chain pipe from water intrusion by sealingly engaging a chain link of the chain. To accommodate for the chain link, the cover lids are each provided with two semicircular recesses shaped in conformity with the contacting outer periphery of a chain link. This solution suffers, however, from an inferior sealing effect around the periphery of the chain link in all but the two opposing—but mutually aligned—sliding directions of the slidable cover lids. This problem is further accentuated by the coarseness of the outer surface of the chain links. Another drawback with this solution is that the slidable cover lids occupy much sideways space in a cramped environment when in an open, retracted position due to protruding rear ends of the lids.

SUMMARY OF THE INVENTION

The above mentioned problem is solved by the invention providing a sealing device for sealing between a chain and a chain pipe, said chain for example being an anchor chain on a marine offshore platform or on a ship, and said chain pipe leading for example to a chain locker for onboard storage of the chain in said platform or ship. The sealing device comprises at least two opposing cover lids positioned at the mouth of the chain pipe. The cover lids are movably arranged from an open position into a closed position in which the cover lids abut each other and seal the chain pipe from water intrusion by sealingly engaging a chain link of the chain. Furthermore, the cover lids are provided—in mutual abutment sides thereof—with one or more recesses shaped in conformity with the contacting outer periphery of said chain link. The invention is especially characterized in that the cover lids each exhibit at least one inflatable seal element, said seal element extending along a respective mutual abutment side of the cover lids and being adapted to expand upon pressurization with a fluid such as pressurized air, into a radial sealing engagement with the chain link, and that the cover lids are attached to an extension collar of the chain pipe, said extension collar being movable with respect to the rest of the chain pipe by means of a flexible interconnection collar mounted therebetween.

In an advantageous embodiment of the invention, each inflatable seal element—in a deflated state—is retracted to a level inside of the outer periphery of the respective cover lid in such a way that a gap is defined between the chain link and the cover lids. Hereby, positioning of said cover lids is facilitated and the seal elements are protected from contact with the chain link until they are inflated into engagement therewith.

One embodiment is provided with a further seal element which extends between the cover lids and the extension collar of the chain pipe.

In a practical embodiment, said further seal element is attached along the inner periphery of the extension collar of the chain pipe.

In another practical embodiment, said further seal element is divided into two sections, each section being attached along the outer periphery of a respective cover lid.

In one embodiment, the further seal element is made of a compressible material and adapted for a radial sealing engagement between the cover lids and the inner periphery of the extension collar of the chain pipe.

In another embodiment, the further sealing element is inflatable and adapted to expand upon pressurization with a fluid such as pressurized air, into a radial sealing engagement between the cover lids and the inner periphery of the chain pipe or an extension collar thereof. Hereby, the further seal element may be in communication with the seal element extending along said respective mutual abutment side of the cover lids.

Conveniently, the cover lids are pivotably hinged to the extension collar of the chain pipe. In such an embodiment, pneumatic or hydraulic actuators may suitably be coupled to the cover lids for opening or closing of said cover lids.

In a preferred embodiment of the invention, a control system is provided for controlling the operation of the actuators and the inflation of the seal elements. The control system includes position indicator means for determining whether the cover lids are open or closed, wherein the output from said position indicator means determines the operation of an anchor winch coupled to the chain, in such a way that operation of the anchor winch is allowed when the cover lids are open and not allowed when they are closed.

In a suitable embodiment, said control system is adapted for remote control of multiple sealing devices with corresponding anchor winches.

Furthermore, in an advantageous embodiment, said control system also includes fluid pressure monitoring—and replenishment means adapted to maintain a predetermined sealing pressure in the inflatable seal elements.

In one embodiment, the cover lids are provided with balancing counterweights projecting from the hinge side thereof in order to facilitate manual opening of the cover lids.

The cover lids may be provided with one or more handles for manual movement of said cover lids in or out of the closed position at the mouth of the extension collar of the chain pipe.

In one embodiment, downwardly extending guide projections are provided on the mutual abutment sides of the cover lids, said guide projections being adapted for guidance through contact with the chain link 10 during closing of the cover lids.

In a practically convenient embodiment, the extension collar and said flexible interconnection collar are each divided into two halves in order to enable the sealing device to be mounted in situ on a chain pipe around the chain.

Preferably, said flexible interconnection collar has a longitudinal cross section which bulges radially outwards.

In a preferred embodiment, the extension collar is further secured to the rest of the chain pipe by means of at least three spring biased bolt assemblies positioned radially outside of the flexible interconnection collar, said bolt assemblies being mutually arranged to strive to center the extension collar with respect to the rest of the chain pipe whilst still allowing movement of said extension collar with respect to the rest of the chain pipe.

Preferably, the spring biased bolt assemblies substantially extend in the axial direction of the extension collar.

The invention also provides a sealing method for sealing between a chain and a chain pipe, said chain for example being an anchor chain on a marine offshore platform or on a ship, and said chain pipe leading for example to a chain locker for onboard storage of the chain in said platform or ship. The sealing method comprises the use of at least two opposing cover lids at the mouth of the chain pipe or an extension collar thereof, said cover lids being movably arranged into a closed position in which the cover lids abut each other and seal the chain pipe from water intrusion by sealingly engaging a chain link of the chain. The cover lids are provided—in mutual abutment sides thereof—with one or more recesses shaped in conformity with the contacting outer periphery of said chain link. The sealing method is especially characterized in the steps of:

positioning the cover lids in said closed position in such a way that a gap is defined between the chain link and the cover lids;

inflating at least one inflatable seal element provided on each cover lid, by means of pressurization with a fluid such as pressurized air, into a radial sealing engagement with the chain link, thereby bridging said gap, the seal element extending along a respective mutual abutment side of the cover lids;

deflating said seal elements upon deactivation of the seal, in such a way that the sealing element is withdrawn from its engagement with the chain link, and moving the cover lids from said closed position to said open position.

Further advantages and features of the invention are described below.

BRIEF DESCRIPTION OF THE DRAWINGS

The invention will now be described in greater detail by way of example only and with reference to the attached drawings, in which.

DESCRIPTION OF PREFERRED EMBODIMENTS

Figure 1:
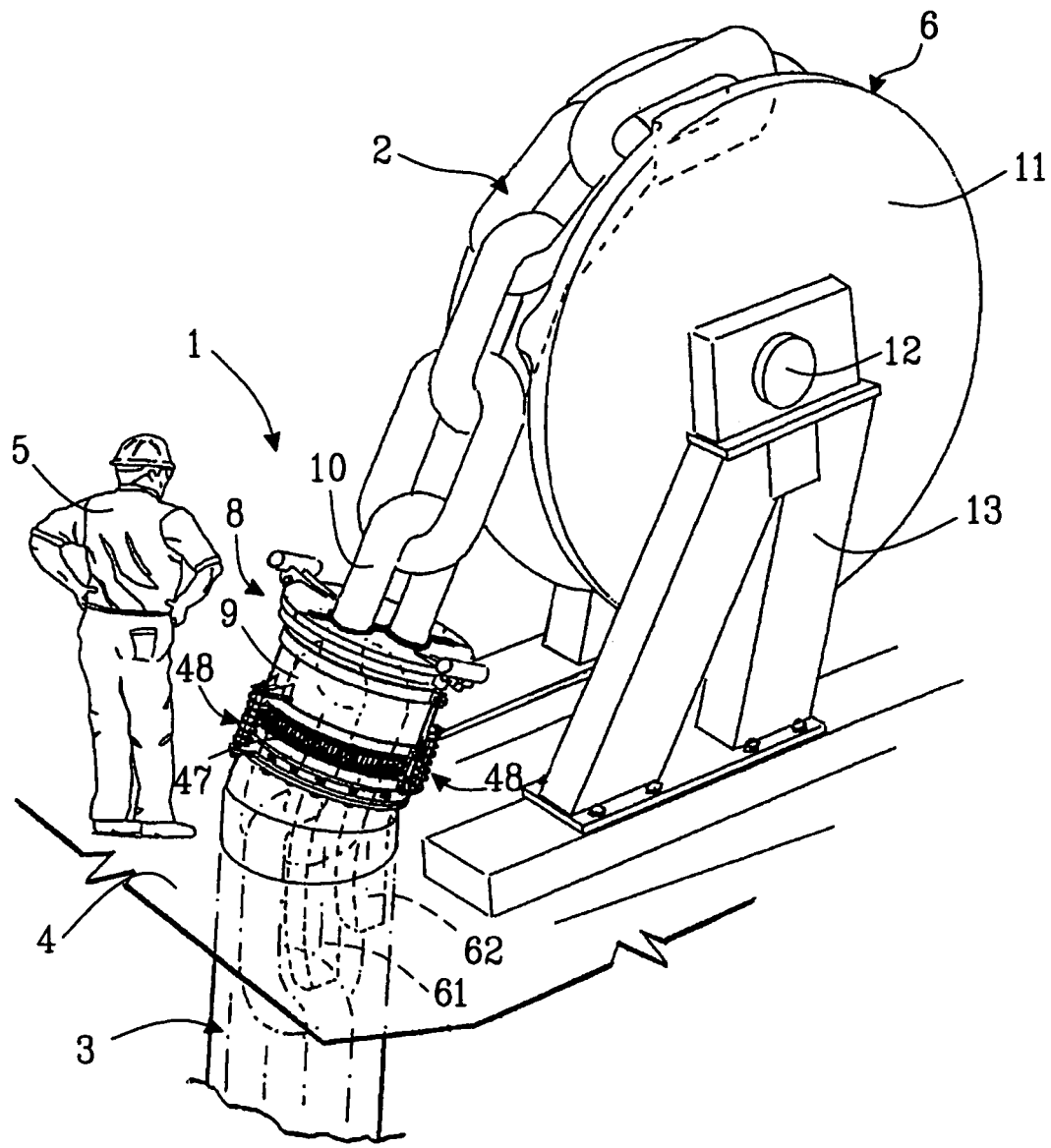
FIG. 1 shows a perspective view of a chain pipe provided with a sealing device according to an embodiment of the invention. A schematic anchor winch is shown next to the chain pipe.

In FIG. 1, reference numeral 1 generally denotes a sealing device for sealing between a chain 2 and a chain pipe 3, said chain 2 for example being an anchor chain on a marine offshore platform—represented here by a section of its deck 4—or on a ship (not shown). The man 5 on the deck 4 indicates the scale of the sealing device 1.

The chain pipe 3 leads down to a chain locker (not shown) for onboard storage of the chain 2 in said offshore platform or ship. Several anchor chains 2 may be arranged at each corner column (not shown) of the offshore platform, and operated by anchor winches 6 such as the one partly shown in FIG. 1.

The sealing device 1 comprises—in the shown embodiment—two generally semi-circular, opposing cover lids 7 positioned at the mouth 8 of the chain pipe 3 or, more particularly of an extension collar 9 of the chain pipe 3, which will be further described below. The cover lids 7 are movably arranged from an open position into a closed position in which the cover lids 7 abut each other and seal the chain pipe 3 from water intrusion by sealingly engaging a chain link 10 of the chain 2. The chain pipe 3 normally has a circular cross-section, as shown in the figure. However, in alternative embodiments (not shown), the chain pipe 3 may instead have a rectangular or a polygonal cross-section. The general shape of the chain pipe 3 also decides the general shape of the cover lids 7, which thus do not necessarily have to be semi-circular.

Figure 2:
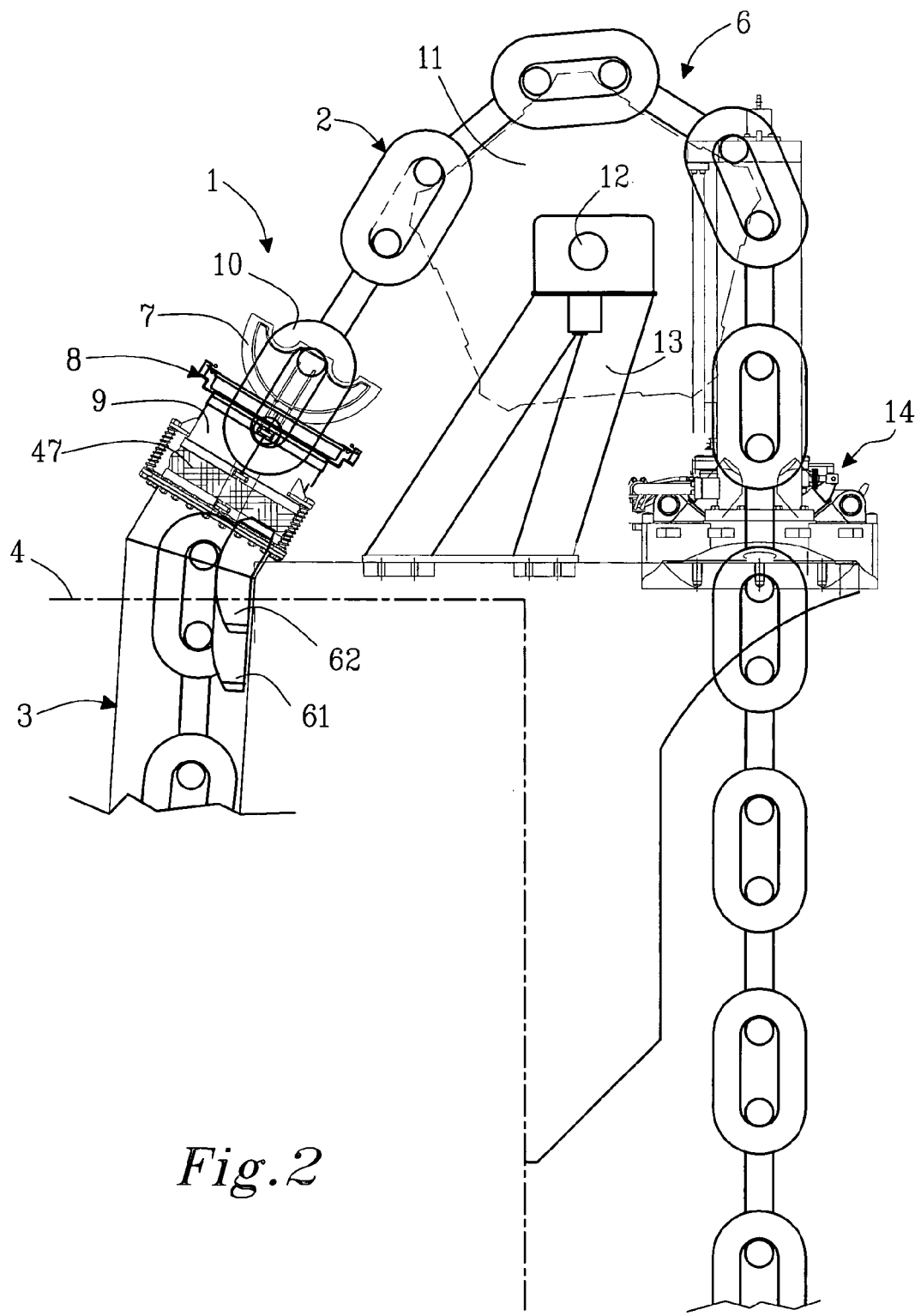
FIG. 2 shows a side view of the embodiment previously shown in FIG. 1.

FIG. 2 shows a more detailed side view of the embodiment previously shown in FIG. 1. Here, the anchor winch 6 is seen to include a pocket or "wildcat" wheel 11—also referred to as a "turn down sheave", which is rotatable about an axle 12. The axle 12 and the pocket wheel 11 are mounted in a support frame 13, said support frame 13 being fixedly attached to the deck 4. The winch 6 may be of a common linear type or alternatively a rotary type (where the pocket wheel 11 is motor driven in smaller size applications). Furthermore, the anchor winch 6 is provided with a chain-stopper assembly 14 capable of locking the chain 2 in discrete steps as determined by the chain links 10. This facilitates the positioning of the cover lids 7 in the sealing device 1. The chain-stopper assembly 14 will not be described in further detail, since it is a known and well established feature within this particular field of technology.

Figure 3:
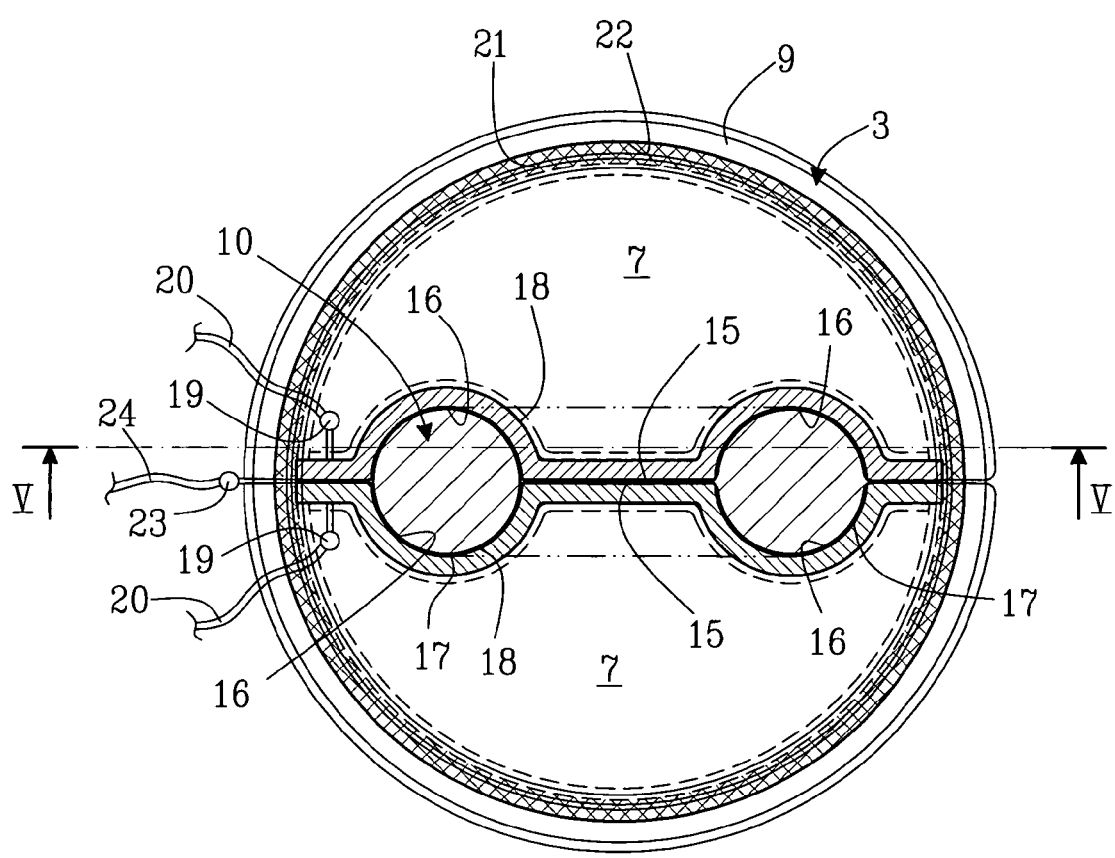
FIG. 3 shows a limited top view of the sealing device according to an advantageous embodiment.

In FIG. 3, a limited top view of the sealing device 1 is shown. As is clearly illustrated in the figure, the cover lids 7 are provided—in mutual abutment sides 15 thereof—with two semi-circular recesses 16 shaped in conformity with the contacting outer periphery 17 of said chain link 10. Depending on the configuration and type of the chain 2, the cover lids 7 may alternatively be provided with a single recess 16 or more than two recesses 16. The chain 2 depicted in the drawings is of the simplest and most common type of chain, having circular cross-section chain links 10. However, the sealing device 1 is equally applicable to other types of chains (not shown) with other cross-sections and general configuration, the recesses 16 in the cover lids being formed thereafter. One alternative chain type may for example be the so-called stud-link chain, in which a transversal cross member (not shown) extends centrally within an otherwise standard chain link 10. In the latter case, there may be a single, elongated recess 16 in each cover lid 7 to accommodate for the cross-member (not shown).

A novel feature of the invention is that the cover lids 7 each exhibit at least one inflatable seal element 18. Each seal element 18 extends along a respective mutual abutment side 15 of the cover lids 7 and is adapted to expand upon pressurization with a fluid such as pressurized air, into a radial sealing engagement with the chain link 10.

With reference now back to FIG. 1 and FIG. 2, another novel feature of the invention is that that the cover lids 7 are attached to the extension collar 9 of the chain pipe 3, said extension collar 3 being movably arranged with respect to the rest of the chain pipe 3 by means of a flexible interconnection collar 47 mounted therebetween. The purpose of the flexible interconnection collar 47 is to accommodate for situations where the chain 2 is a slightly off center with respect to the mouth 8 of chain pipe 2. In such cases, the extension collar 9 is allowed to adapt to the position of the chain 2, by way of transversal displacement and/or a tilting movement with respect to the rest of the chain pipe 3. The chain 2 is subjected to a considerable tensile load from its own weight, which means that considerable force is required in order to forcibly move the chain 2 sideways, i.e. transversally with respect to the mouth 8 of the chain pipe 3. Thus, the fact that the extension collar 9 is allowed to move relative to the chain 2 and the rest of the chain pipe 3 by means of the flexible interconnection collar 47 is an advantageous feature of the invention. This feature relieves the extension collar 9 from substantial structural loads that would otherwise require a corresponding upsizing of the sealing device 1 with a consequential increase in both weight and cost. The flexible interconnection collar 47 will be described in greater detail later in this description with reference to FIG. 6 and FIG. 8.

As seen in FIG. 3, the inflatable seal elements 18 follow the contour of the respective abutment sides 15 of the cover lids 7, including the recesses 16. Each of the two seal elements 18 are provided with an connecting nipple 19, through which air may be filled into—or evacuated out of the seal element 18. Via air hoses 20, the connecting nipples 19 are connected to a source of pressurized air (not shown), for example in the form of a compressor (not shown), a pressurized air tank (not shown) or a manually operated hand pump (not shown). Other fluids—in liquid, gas or gel form—may alternatively be utilized for operating the seal elements 18.

The embodiment shown in FIG. 3 also includes a further seal element 21 extending between the cover lids 7 and the extension collar 9 of the chain pipe 3. This further seal element 21 is—in the shown embodiment—continually ring-shaped and attached along the inner periphery 22 of the extension collar 9 of the chain pipe 3. In the shown embodiment, said further sealing element 21 is inflatable like the other seal elements 18 and adapted to expand upon pressurization with a fluid such as pressurized air, into a radial sealing engagement between the cover lids 7 and the inner periphery 22 of the extension collar 9 of the chain pipe 3. Thus, the further seal element 21 is provided with a connecting nipple 23 through which air may be filled into—or evacuated out of the further seal element 21. Via an air hose 24, the connecting nipple 23 is connected to the same source of pressurized air (not shown), which is also connected to the other two seal elements 18. In an alternative, not shown embodiment, the further seal element 21 is made of a compressible material such as rubber or a plastic foam material, and adapted for a radial sealing engagement between the cover lids 7 and the inner periphery 22 of the extension collar 9 of the chain pipe 3.

Figure 4:
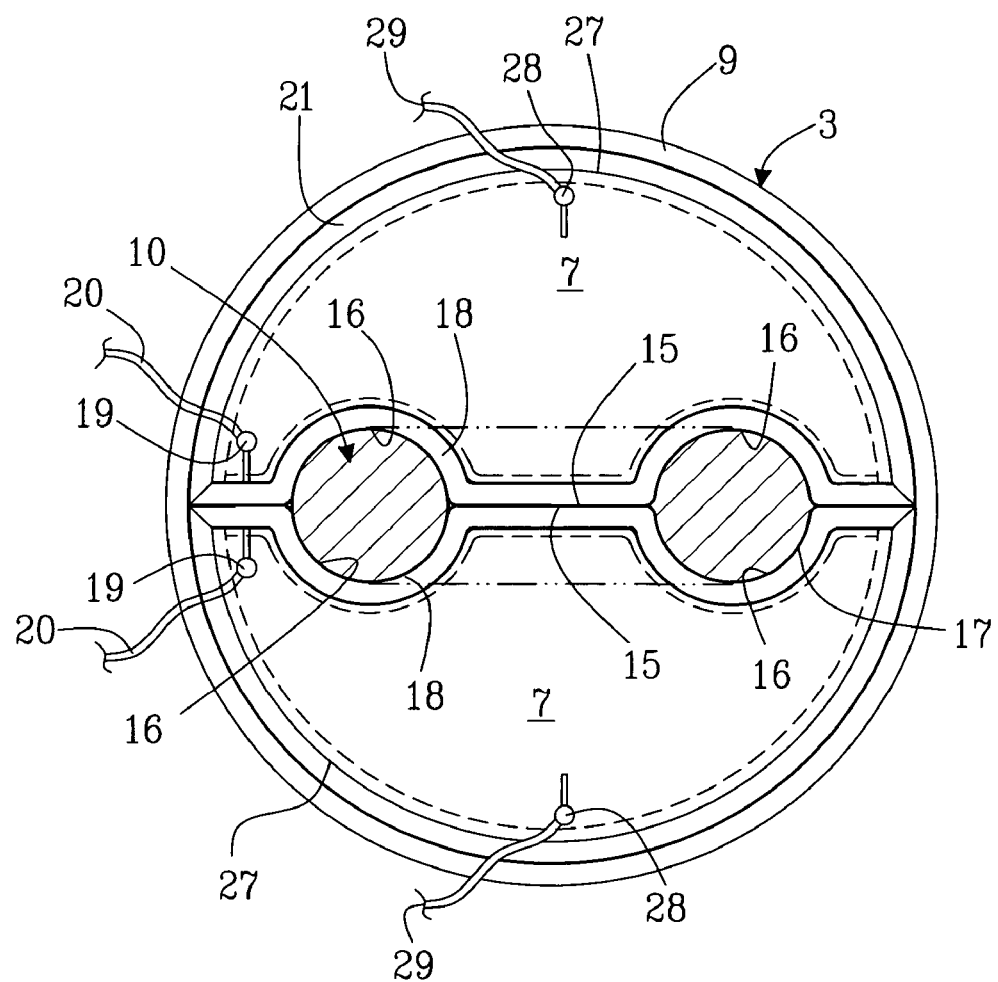
FIG. 4 shows a limited top view of an alternative embodiment, in which the further seal element is divided into two semi-circular sections.

FIG. 4 shows an alternative embodiment in which the further seal element 21 is divided into two semi-circular sections 25, 26. Each section 25, 26 is attached along the outer periphery 27 of a respective cover lid 7, and is provided with an connecting nipple 28 which in turn is connected via an air hose 29 to the same source of pressurized air (not shown) which is also connected to the other two seal elements 18. Alternatively, in a similar embodiment (not shown), each section 25, 26 of the further seal element 21 is in communication with the respective seal element 18 extending along said respective mutual abutment side 15 of the cover lids 7. Hereby, only one connecting nipple is needed on each cover lid 7.

Figure 5:
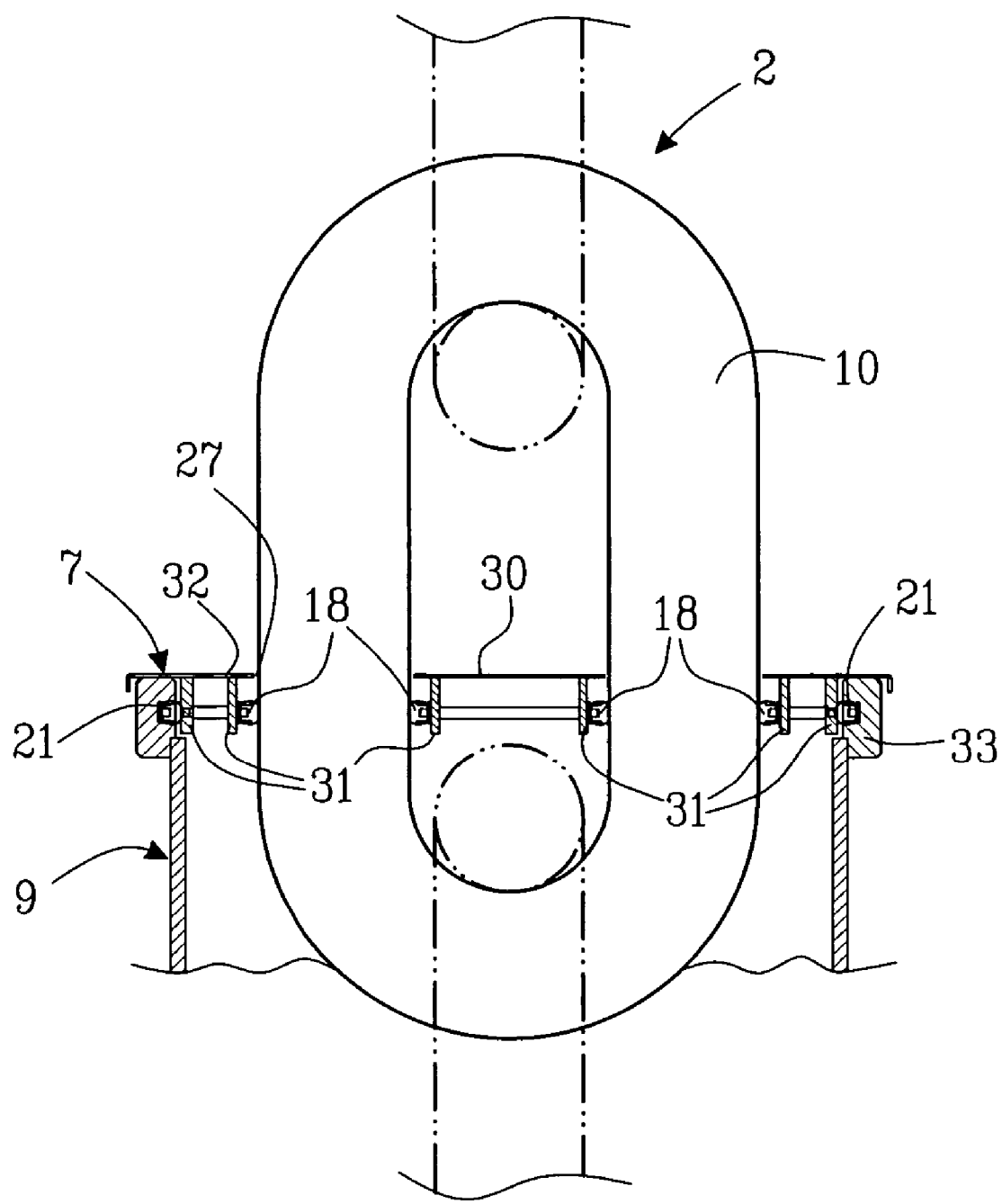
FIG. 5 shows a cross-section side view of the sealing device taken along line V—V in FIG. 3.

FIG. 5 shows a cross-section side view of the sealing device 1 taken along line V-V in FIG. 3. In this view, the design of one of the cover lids 7 is shown to include a horizontal surface-covering top plate 30 supported by an underlying, vertically downwards extending framework of ribs 31. The inflatable seal elements 18 are attached laterally to the ribs 31 under an overhang portion 32 of the top plate 30 with respect to the ribs 31, in such a way that each inflatable seal element 18—in an deflated state—is retracted to a level inside of the outer periphery 27 of the respective cover lid 7 in such a way that a gap is defined between the chain link 10 and the cover lids 7. Hereby, positioning of the cover lids 7 is facilitated and the retracted, deflated seal elements 18 are protected by the overhang portion 32 from contact with the chain link 10 until they are inflated into radial engagement therewith. FIG. 5 also shows that the seal element 21—above referred to as the further seal element—is mounted within a recessed flange 33 formed as part of the extension collar 9 of the chain pipe 3. In this way, the further seal element 21 in a deflated state—is protected within the flange 33 from contact with the cover lids 7 until it is inflated into radial engagement the ribs 31 on the cover lids 7. As is further shown in FIG. 5, the top plate 30 of the cover lids 7 extends over—and is adapted to rest upon the flange 33 of the extension collar 9. An example of a suitable type of inflatable seal 18, 21 will be described in more detail further on in this description, with reference to FIG. 11.

Figure 6:
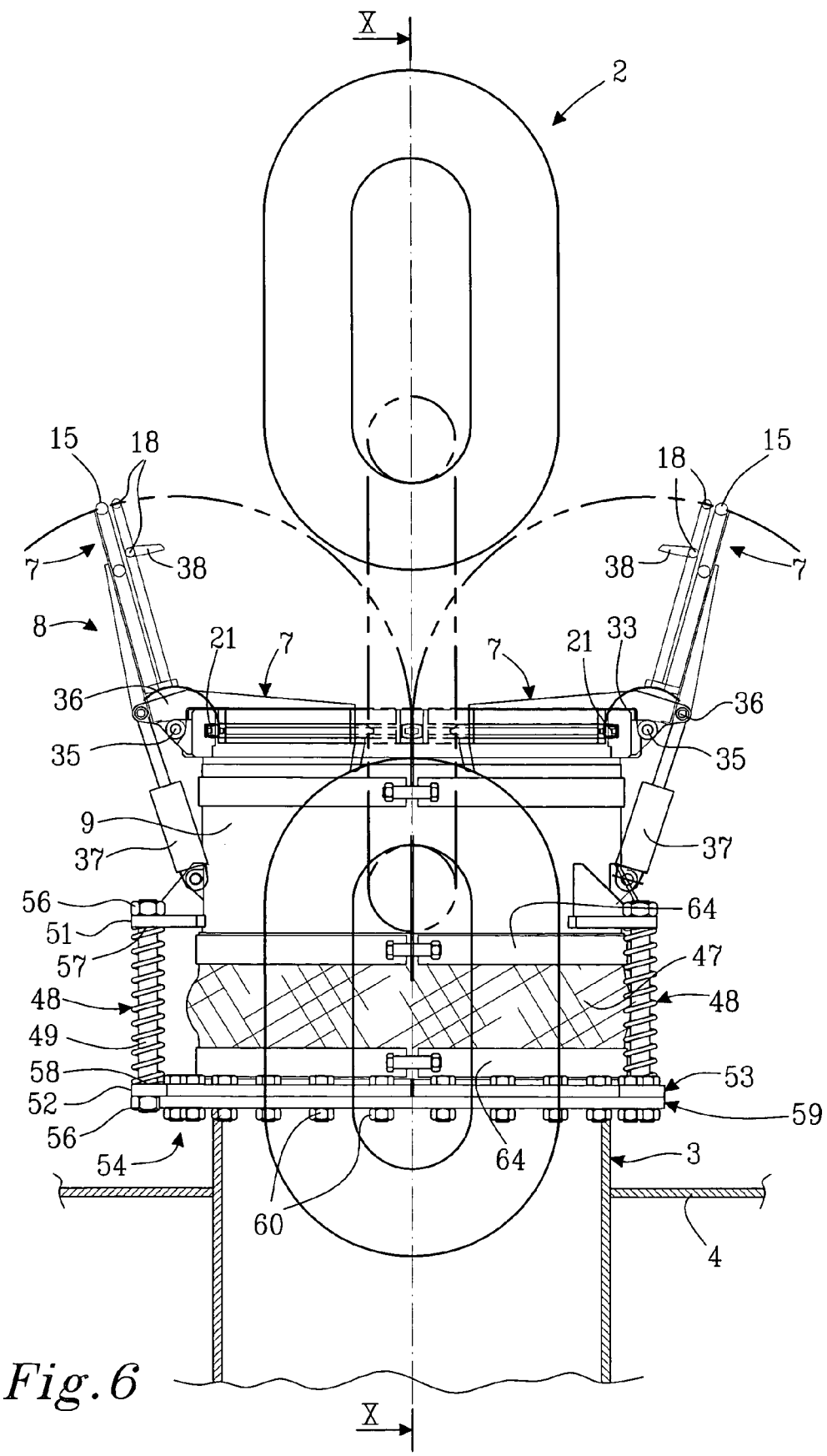
FIG. 6 shows a partially cross-sectioned side view of an embodiment wherein pneumatic or hydraulic actuators are coupled to the cover lid.

FIG. 6 shows a partially cross-sectioned side view of an embodiment wherein the cover lids 7 are pivotably hinged at the mouth 8 of the extension collar 9 of the chain pipe 3. More particularly, the cover lids 7 are hinged on hinge-pins 35 which are attached to the flange 33 of the extension collar 9 by means of brackets 36. Pneumatic actuators 37 are coupled to the cover lids 7 for opening or closing of said cover lids 7. Alternatively, the actuators 37 may instead be hydraulically operated. In FIG. 6, the cover lids 7 are shown both in an open position and in a closed position. In order to ensure proper engagement of the cover lids 7 with respect to the chain link 10 when the cover lids 7 are closing, downwardly extending guide projections 38 are provided on the mutual abutment sides 15 of the cover lids 7. The guide projections 38 are slightly angled relative to the cover lids 7 and are designed to provide guidance through contact with the chain link 10 during closing of the cover lids 7.

In the embodiment shown in FIG. 6, the extension collar 9 is further secured to the rest of the chain pipe 3 by means of three spring biased bolt assemblies 48 (two of which are shown in FIG. 6), in order to achieve a self centering of the extension collar 9 with respect to the rest of the chain pipe 3. In alternative embodiments, more than three bolt assemblies 48 may be provided. The bolt assemblies 48 are positioned radially outside of the flexible interconnection collar 47 and are mutually arranged to strive to center the extension collar 9 with respect to the rest of the chain pipe 3 whilst still allowing movement of said extension collar 9 with respect to the rest of the chain pipe 3. The bolt assemblies 48 substantially extend in the axial direction of the extension collar 9, and each comprise a cylindrical bolt 49, a coil spring 50 as well as an upper mounting bracket 51 on the movable extension collar 9 and a lower mounting bracket 52 formed on a mounting flange 53 on a fixed end 54 of the chain pipe 3. The bolt 49 extends through holes 55 (see FIG. 7) in the upper- and lower mounting brackets 51, 52 respectively and has a stopping nut 56 at each end. As is clearly shown in FIG. 6, the coil spring 50 is arranged around the bolt 49 and between opposing abutment surfaces on the respective mounting brackets 51, 52. The diameter of the holes 55 exceeds the diameter of the bolt 49, in order to allow a limited amount of transverse or tilting movement of the extension collar 9 relative to the fixed end 54 of the chain pipe 3. Thus, the bolt 49 is free to move through the holes 55, whilst the coil spring 50 strives to push the upper mounting bracket 51 away from the lower mounting bracket 52 until the both stopping nuts 56 abut their respective mounting brackets 51, 52. Since at least three bolt assemblies 48 are provided at radially interspersed locations around the extension collar 9, a spring biased self centering effect on the extension collar 9 is obtained, whilst the extension collar 9 is still allowed to move upon contact with an off-centered chain 2. The mounting flange 53 is fastened to a corresponding flange 59 attached to the fixed end 54 of the chain pipe 3 by means of a plurality of fastening bolts 60.

Figure 7:
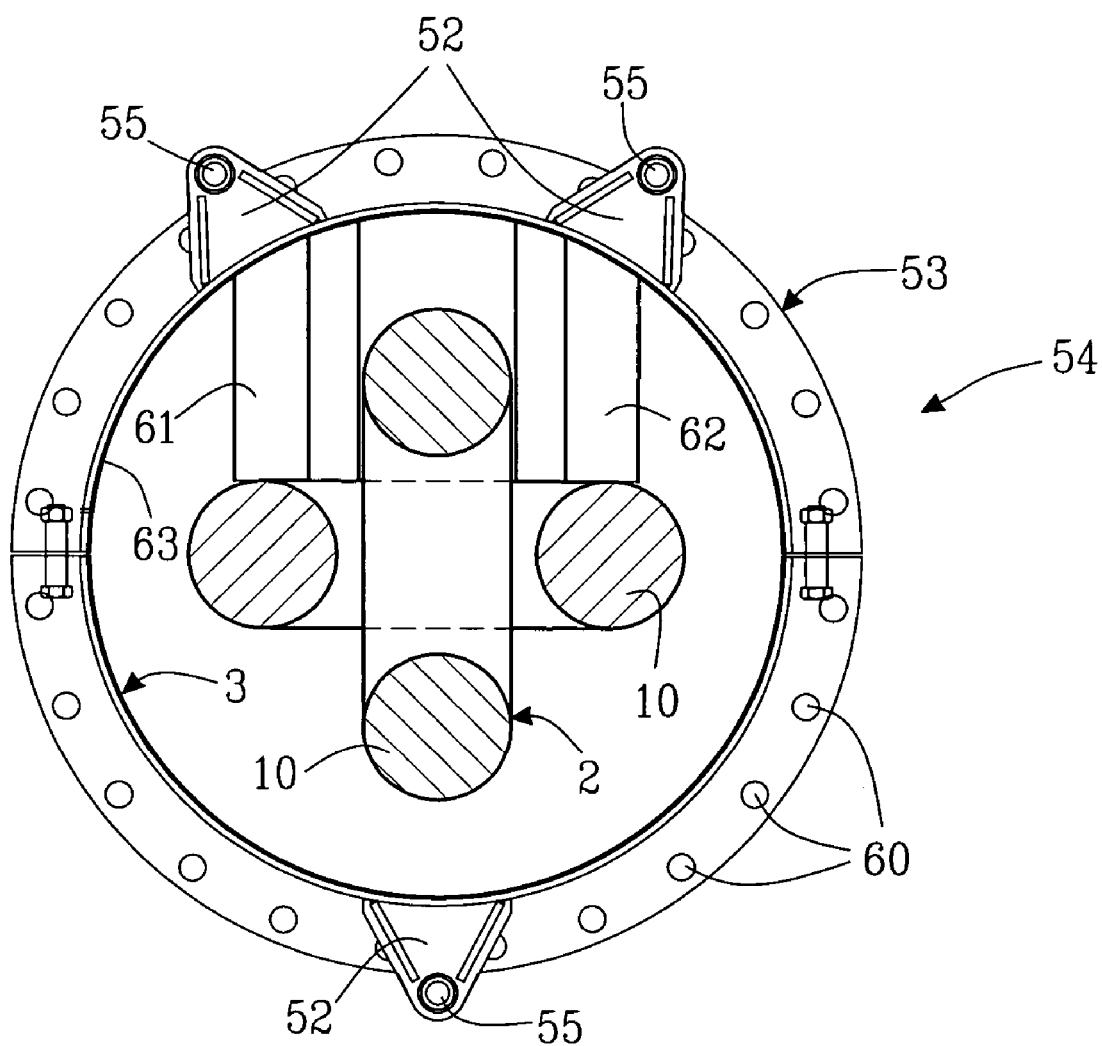
FIG. 7 shows a top view of a mounting flange for the sealing device according to the invention, provided with three lower mounting brackets for spring biased bolt assemblies.

In FIG. 7, the mounting flange 53 and the fixed end of the chain pipe 3 is seen from above, whereby the mutual positioning of the lower mounting brackets 52 and their holes 55 is clearly visible. Furthermore, two chain guide rails 61, 62 extend along the inner periphery 63 of the chain pipe 3. The chain guide rails 61, 62 are shaped to provide a guiding support for the chain links 10, and can also bee seen in FIG. 1 and FIG. 2.

Referring back again to FIG. 6, the flexible interconnection collar 47 to the extension collar 9 and the mounting flange 53 by means of circular fastening bands 64. The interconnection collar 47 is suitably made of an elastic material such rubber or a rubber-like polymer, and preferably has a longitudinal cross section which bulges radially outwards, as in the exemplary embodiment shown in the figure. The bulbous external shape of the interconnection collar 49 is formed to improve resistance to external water pressure and to facilitate elastic deformation as the extension collar 9 moves with the chain 2.

Figure 8:
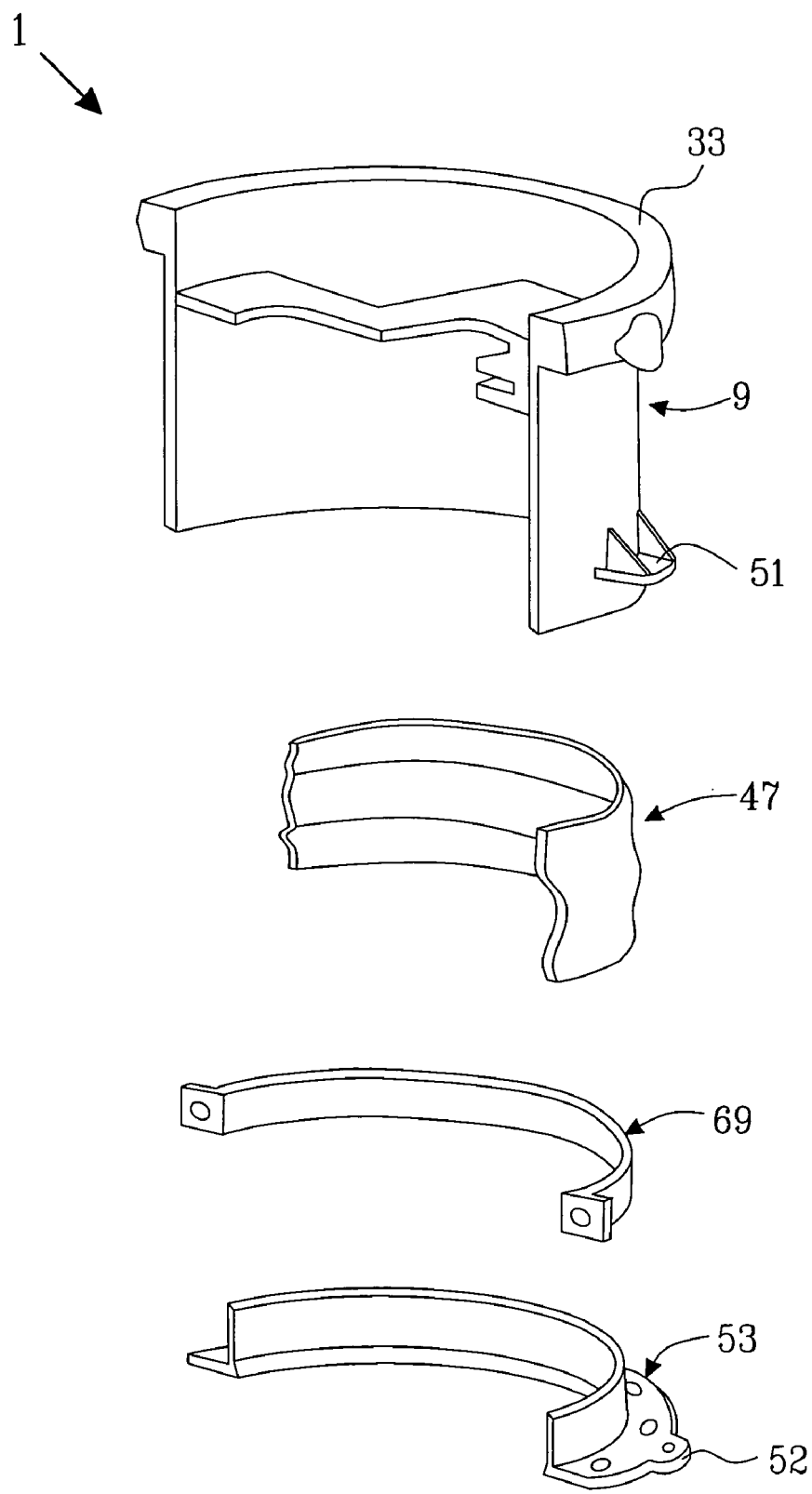
FIG. 8 shows an exploded perspective view of one set of respective halves of the extension collar, the flexible interconnection collar, a fastening band and a mounting flange for the sealing device.

As shown in FIG. 8, the sealing device 1 is conveniently divided into two halves—only one half shown in the "exploded" view of FIG. 8)—in order to enable the sealing device 1 to be mounted in situ on a chain pipe 3 around the chain 2. Thus, the extension collar 9, the flexible interconnection collar 47, the fastening bands 64 (only one of them shown in the figure) and the mounting flange 53 are each divided into two halves as seen in the figure. The halves of the flexible interconnection collar 47 may conveniently be vulcanized together upon the in situ mounting procedure, in order to obtain a watertight joint.

Figure 9:
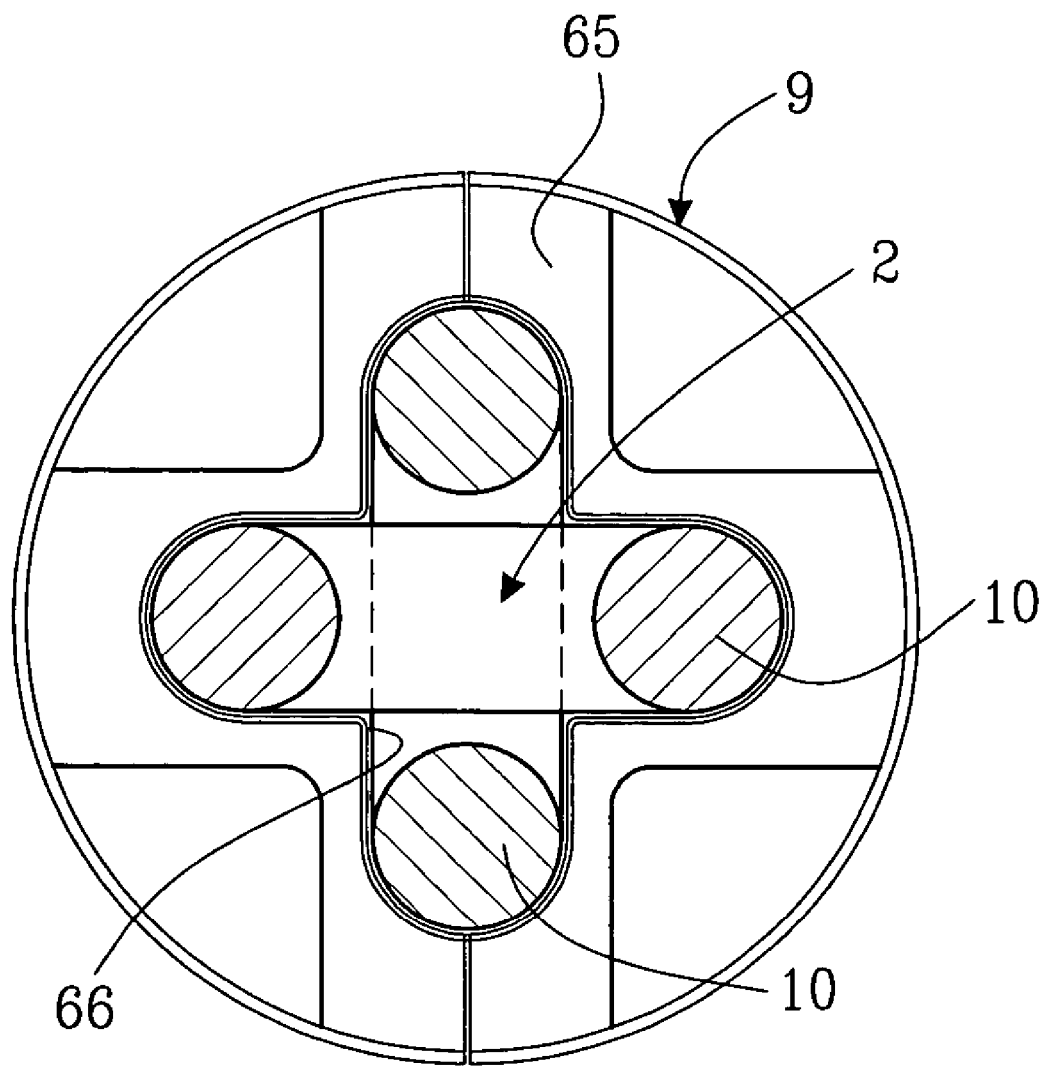
FIG. 9 shows a top cross-sectional view of the extension collar, which in the shown embodiment is provided with an internal cruciform guide plate for the chain.

FIG. 9 shows a top cross-sectional view of the extension collar 9, which in the shown embodiment is provided with an internal cruciform guide plate 65 for the chain 2. The guide plate 65 has a central slot 66, which is contoured after the chain links 10.

Figure 10:
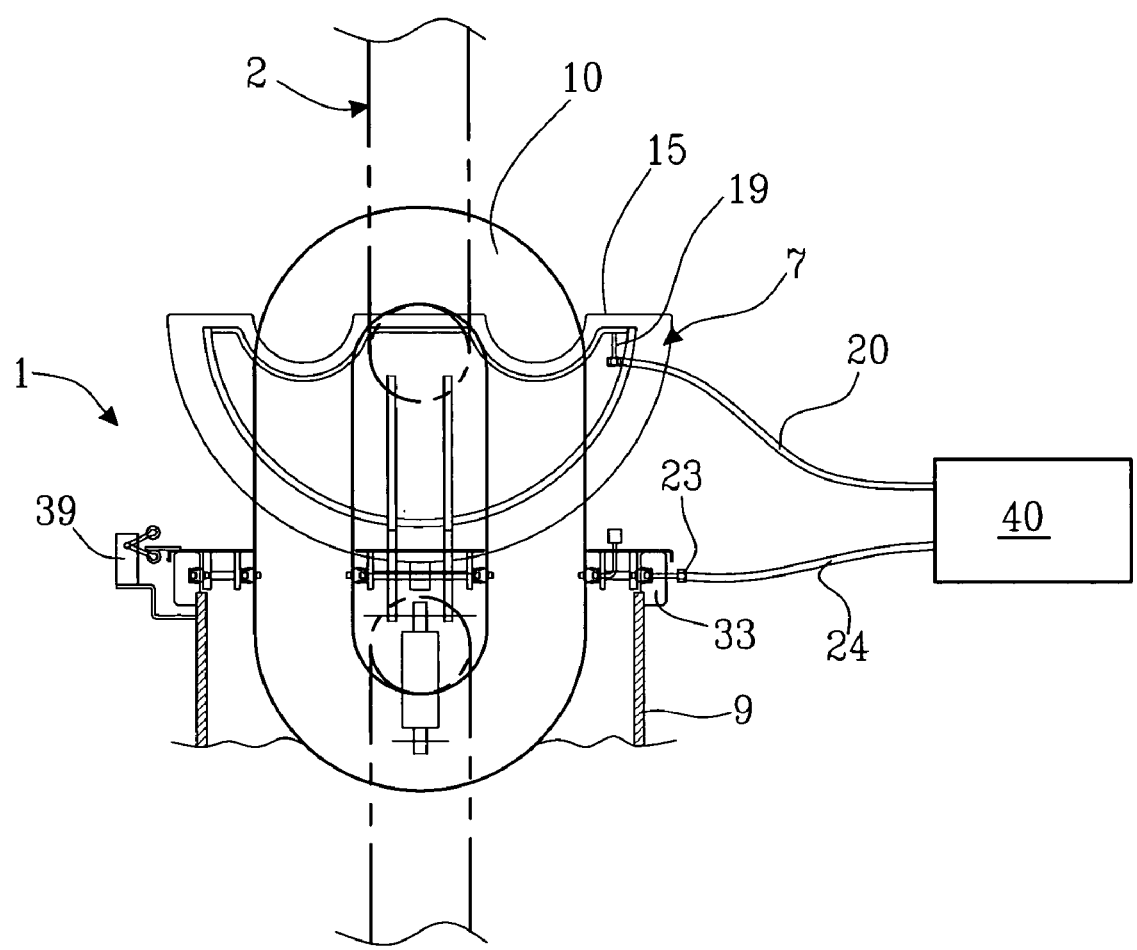
FIG. 10 shows a partial cross-section side view of the sealing device taken along line X—X in FIG. 6.

FIG. 10 shows a partial cross-section side view of the sealing device 1 taken along line X—X in FIG. 6. As in FIG. 6, the cover lids 7 are shown both in an open position and in a closed position. A control system is provided for controlling the operation of the actuators 37 (as seen in FIG. 6) and the inflation of the seal elements 18, 21. This control system includes position indicator means 39 for determining whether the cover lids 7 are open or closed. The output from said position indicator means 39 determines the operation of an anchor winch 6 (as seen in FIGS. 1 and 2) coupled to the chain 2, in such a way that operation of the anchor winch 6 is allowed when the cover lids are open and not allowed when they are closed. The control system is adapted for remote control of multiple sealing devices 1 with corresponding anchor winches 6.

Suitably, the control system further includes fluid pressure monitoring—and replenishment means 40 adapted to maintain a predetermined sealing pressure in the inflatable seal elements 18, 21. In FIG. 10, said fluid pressure monitoring—and replenishment means 40 is illustrated as a schematic box only, but will typically include one or more pressure sensors (not shown), an air compressor (not shown) and an accumulator air tank (not shown). Hereby, the control system will automatically compensate for any pressure variations in the seal elements 18, 21 as caused, for example, from variations in ambient temperature conditions.

Figure 11:
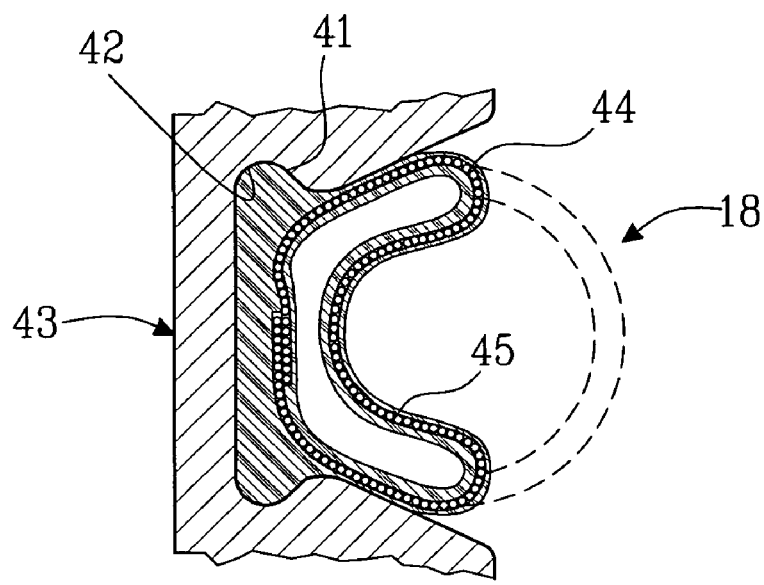
FIG. 11 shows cross-section of an exemplary, commercially available inflatable seal element suitable for use as a seal element according to the invention.

In FIG. 11, a cross-section of an exemplary, commercially available inflatable seal element 18 is shown. The seal element 18 is shown both in its collapsed deflated state and its rounded inflated state (the latter shown with dashed lines). In this example, transverse mounting projections 41 are arranged along each side of the seal element 18. The mounting projections 41 snap into mounting grooves 42 formed in a mounting base 43. The shown seal element 18 is mainly contituted by an elastomeric tube 44 of a substantially circular cross section when in its inflated state. The elastomeric tube 44 is reinforced by an embedded fabric 45. The fabric 45 may include metal fibers or synthetic fibers or a combination of both.

In a not shown embodiment, the cover lids 7 are provided with balancing counterweights projecting from the hinge side of the cover lids 7 in order to facilitate manual opening of the cover lids 7.

Figure 12:
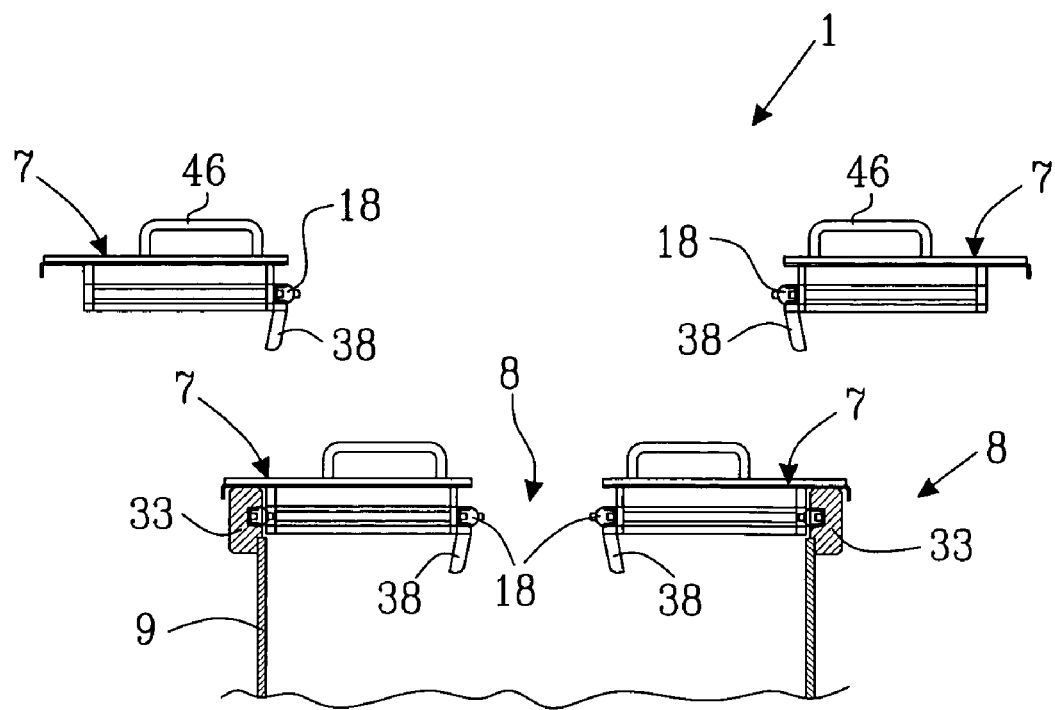
FIG. 12 shows schematic cross-section side view of an embodiment wherein the cover lids are separately detachable by means of handles provided on the top side of the cover lids, and FIG. 13 finally shows a top view of an alternative embodiment of the invention, wherein the cover lids are adapted for so called studded chain.

FIG. 12 shows an alternative embodiment wherein the cover lids 7 are provided with one or more handles 46 for manually moving said cover lids in or out of the closed position at the mouth 8 of the chain pipe 3, or more particularly of the extension collar 9 of the chain pipe 3. The shown cover lids 7 are intended to be manually lifted in place on the extension collar 9. Thus the cover lids 7 are shown both in a lifted off position and in a closed position on the extension collar 9. It should be noted, however, that handles 49 may also be provided on the cover lids 7 in embodiments wherein the cover lids 7 are pivotably hinged at the mouth 8 of the extension collar 9 of the chain pipe 3. Furthermore, in this figure, the downwardly extending guide projections 38 on the cover lids 7 are clearly shown.

Figure 13:
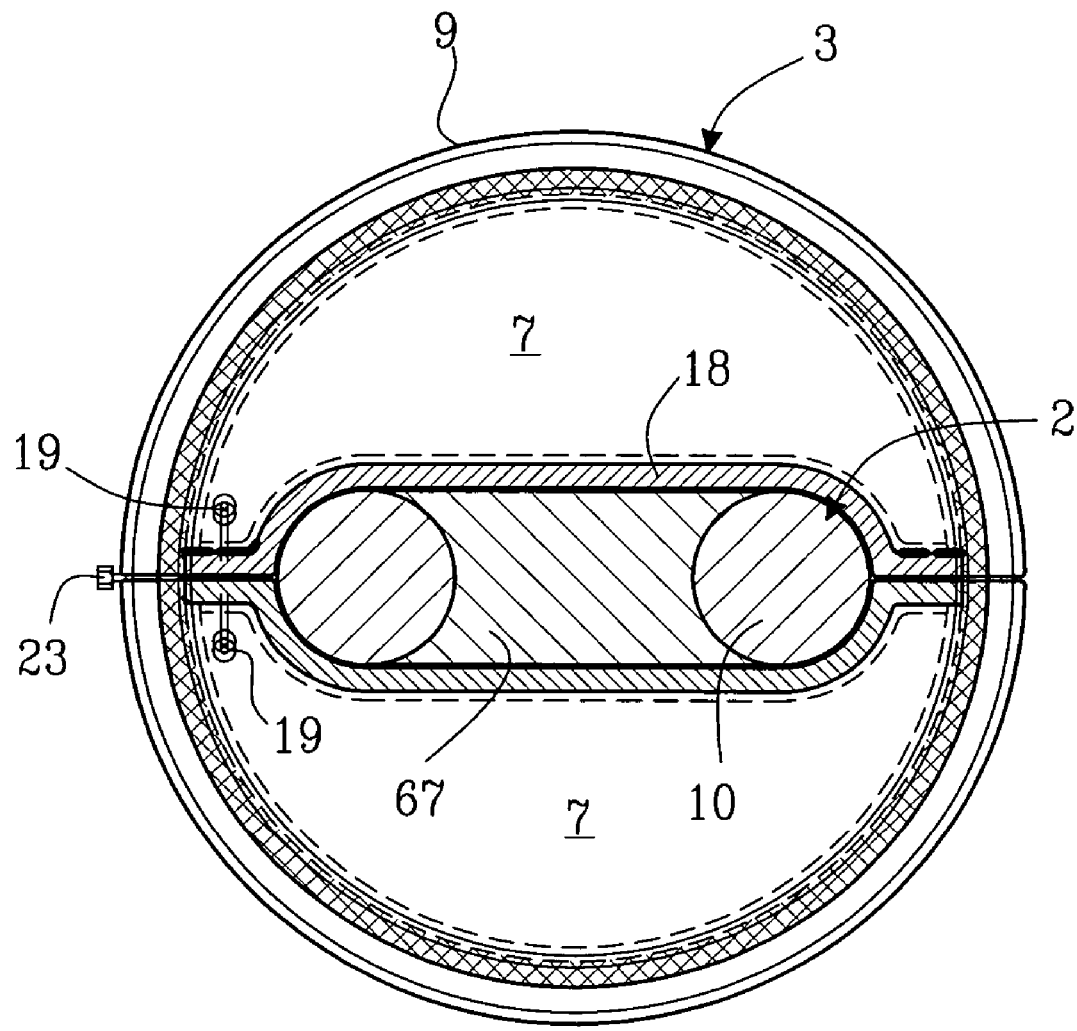

In FIG. 13, an alternative embodiment is shown, wherein the cover lids 7 and the seal elements 18 are adapted for a so called studded chain 2 i.e. where each chain link 10 is provided with a transversally extending stud 67.

The sealing method according to the invention comprises comprises the steps of:

positioning the cover lids 7 in said closed position in such a way that a gap is defined between the chain link 10 and the cover lids 7;

inflating at least one inflatable seal element 18 provided on each cover lid 7, by means of pressurization with a fluid such as pressurized air, into a radial sealing engagement with the chain link 10, thereby bridging said gap, the seal element 18 extending along a respective mutual abutment side 15 of the cover lids 7;

deflating said seal elements 18 upon deactivation of the seal, in such a way that the sealing element 18 is withdrawn from its engagement with the chain link 10, and moving the cover lids 7 from said closed position to said open position.

It is to be understood that the invention is by no means limited to the embodiments described above, and may be varied freely within the scope of the appended claims. Fore example, there may be more than two cover lids 7, depending on the geometry of the type of chain 2 which used in a certain application.

What is claimed is:

1. A sealing device for sealing between a chain and a chain pipe, said chain for example being an anchor chain on a marine offshore platform or on a ship, and said chain pipe leading for example to a chain locker for onboard storage of the chain in said platform or ship, the sealing device comprising at least two opposing cover lids positioned at the mouth of the chain pipe, said cover lids being movably arranged from an open position into a closed position in which the cover lids abut each other and seal the chain pipe from water intrusion by sealingly engaging a chain link of the chain, the cover lids being provided -in mutual abutment sides thereof, with one or more recesses shaped in conformity with the contacting outer periphery of said chain link, wherein:

the cover lids each exhibit at least one inflatable seal element, said seal element extending along a respective mutual abutment side of the cover lids and being adapted to expand upon pressurization with a fluid such as pressurized air, into a radial sealing engagement with the chain link, and the cover lids are attached to an extension collar of the chain pipe, said extension collar being movably arranged with respect to the rest of the chain pipe by means of a flexible interconnection collar mounted therebetween.

2. The sealing device according to claim 1, wherein each said inflatable seal element, in an deflated state, is retracted to a level inside of the outer periphery of the respective cover lid in such a way that a gap is defined between the chain link and the cover lids, whereby positioning of said cover lids is facilitated and the seal elements are protected from contact with the chain link until they are inflated into engagement therewith.

3. The sealing device according to claim 1 or 2, wherein a further seal element extends between the cover lids and the extension collar of the chain pipe.

4. The sealing device according to claim 3, wherein said further seal element is attached along the inner periphery of the extension collar of the chain pipe.

5. The sealing device according to claim 3, wherein said further seal element is divided into two sections, each section being attached along the outer periphery of a respective cover lid.

6. The sealing device according to claim 4, wherein said further seal element is made of a compressible material and adapted for a radial sealing engagement between the cover lids and the inner periphery of the extension collar of the chain pipe.

7. The sealing device according to claim 3, wherein said further sealing element is inflatable and adapted to expand upon pressurization with a fluid such as pressurized air, into a radial sealing engagement between the cover lids and the inner periphery of the extension collar of the chain pipe.

8. The sealing device according to claim 7, wherein said further seal element is in communication with the seal element extending along said respective mutual abutment side of the cover lids.

9. The sealing device according to claim 1, characterized in that the cover lids are pivotably hinged to the extension collar of the chain pipe.

10. The sealing device according to claim 9, wherein pneumatic or hydraulic actuators are coupled to the cover lids for opening or closing of said cover lids.

11. The sealing device according to claim 10, characterized in that a control system is provided for controlling the operation of the actuators and the inflation of the seal elements, said control system including position indicator means for determining whether the cover lids are open or closed, wherein the output from said position indicator means determines the operation of an anchor winch coupled to the chain, in such a way that operation of the anchor winch is allowed when the cover lids are open and not allowed when they are closed.

12. The sealing device according to claim 11, wherein said control system is adapted for remote control of multiple sealing devices with corresponding anchor winches.

13. The sealing device according to claim 11 or 12, wherein said control system further includes fluid pressure monitoring -and replenishment means adapted to maintain a predetermined sealing pressure in the inflatable seal elements.

14. The sealing device according to claim 9, wherein the cover lids are provided with balancing counterweights projecting from the hinge side thereof in order to facilitate manual opening of the cover lids.

15. The sealing device according to claim 1, characterized in that the cover lids are provided with one or more handles for manual movement of said cover lids in or out of the closed position at the mouth of the chain pipe.

16. The sealing device according to claim 1, wherein downwardly extending guide projections are provided on the mutual abutment sides of the cover lids, said guide projections being adapted for guidance through contact with the chain link during closing of the cover lids.

17. The sealing device according to claim 1, wherein said extension collar and said flexible interconnection collar are each divided into two halves in order to enable the sealing device to be mounted in situ on a chain pipe around the chain.

18. The sealing device according to claim 1, wherein said flexible interconnection collar has a longitudinal cross section which bulges radially outwards.

19. The sealing device according to claim 1, characterized in that the extension collar is further secured to the rest of the chain pipe by means of at least three spring biased bolt assemblies positioned radially outside of the flexible interconnection collar, said bolt assemblies being mutually arranged to strive to center the extension collar with respect to the rest of the chain pipe whilst still allowing movement of said extension collar with respect to the rest of the chain pipe.

20. The sealing device according to claim 19, wherein said spring biased bolt assemblies substantially extend in the axial direction of the extension collar.

* * * * *